United States Patent
Sentpali et al.

(10) Patent No.: US 6,523,790 B2
(45) Date of Patent: Feb. 25, 2003

(54) HOLDING DEVICE FOR PIPES AND A METHOD OF MAKING AND USING SAME

(75) Inventors: Stefan Sentpali, Pfaffenhofen (DE); Albert Bauer, Munich (DE); Martin Gromes, Bad Soden-Salmuenster (DE); Georg Raasch, Schluechtern (DE)

(73) Assignees: Bayerische Motoren Werke AG, Munich (DE); Woco AVS GmbH, Bad Soden-Salmuenster (DE)

( * ) Notice: Subject to any disclaimer, the term of this patent is extended or adjusted under 35 U.S.C. 154(b) by 0 days.

(21) Appl. No.: 09/907,445

(22) Filed: Jul. 18, 2001

(65) Prior Publication Data

US 2002/0066835 A1 Jun. 6, 2002

(30) Foreign Application Priority Data

Jul. 18, 2000 (DE) .......................... 100 35 020

(51) Int. Cl.⁷ ................................. F16L 3/22
(52) U.S. Cl. ......................... 248/68.1; 248/70
(58) Field of Search ............... 248/68.1, 70, 74.2, 248/74.4, 21, 67.7, 74.1; 24/16 PB, 28, 21, 201.5, 482, 485, 563

(56) References Cited

U.S. PATENT DOCUMENTS

| | | | | |
|---|---|---|---|---|
| 3,856,244 A | * | 12/1974 | Menshen | 248/54 R |
| T100,605 I4 | * | 5/1981 | Christian | 248/68 R |
| 4,669,156 A | * | 6/1987 | Guido et al. | 24/336 |
| 4,730,800 A | * | 3/1988 | Engman | 248/316.5 |
| 5,263,671 A | * | 11/1993 | Baum | 248/68.1 |
| 5,669,590 A | | 9/1997 | Przewodek | 248/68.1 |
| 5,794,897 A | * | 8/1998 | Jobin et al. | 248/74.4 |
| 5,971,330 A | * | 10/1999 | Noba et al. | 248/56 |
| 6,308,921 B1 | * | 10/2001 | Borzucki | 248/68.1 |
| 6,446,915 B1 | * | 9/2002 | Ismert | 24/271 |

FOREIGN PATENT DOCUMENTS

| | | |
|---|---|---|
| DE | 8816188 | 3/1989 |
| DE | 9005368 | 8/1990 |
| DE | 9011879 | 11/1990 |
| DE | 19540168 | 4/1997 |
| DE | 29911639 | 10/1999 |
| DE | 19857853 | 6/2000 |
| EP | 626533 A1 | 11/1994 |
| EP | 0886093 | 12/1998 |

* cited by examiner

*Primary Examiner*—Leslie A. Braun
*Assistant Examiner*—A. Joseph Wujciak, III
(74) *Attorney, Agent, or Firm*—Crowell & Moring LLP

(57) ABSTRACT

The present invention relates to a holding device for pipes and a method of making and using same. The holding device includes a fixed support bracket and at least one elastic element arranged with the fixed support bracket. A clip is supported by the at least one elastic element such that the clip is movable in all spatial directions and is decoupled from the fixed support bracket by way of the at least one elastic element. The holding device of the present invention prevents the deterioration of acoustic properties even under critical conditions.

9 Claims, 2 Drawing Sheets

HOLDING DEVICE FOR PIPES AND A METHOD OF MAKING AND USING SAME

BACKGROUND AND SUMMARY OF THE INVENTION

This application claims the priority of German Application No. 100 35 020.8, filed in Germany on Jul. 18, 2000, the disclosure of which is expressly incorporated by reference herein.

The invention relates to a holding device for holding pipes and a method of making and using same.

Such holding devices are used for the pipes of hydraulic systems to hold and provide vibration decoupling to units and pipes with average insulation properties. Until now, plastic clips with elastomer inserts have been used for this purpose.

However, known plastic clips have several drawbacks. Firstly, they provide acoustically insufficient decoupling for hydraulic systems. Secondly, their ability to compensate tolerances is very limited. This can cause the holding device to be deformed and lead to acoustic deterioration. Further, proper installation of these known holding devices is critical since they lose their acoustic insulation properties if they are deformed during installation.

Thus, the object of the invention is to develop a holding device that obviates these drawbacks and does not lead to a deterioration of the acoustic properties even under critical conditions.

The holding device according to the invention has the advantage, on the one hand, that it can absorb or compensate tolerances or changes in pipe length in any direction. On the other hand, good acoustic decoupling of the pipes is achieved even if tolerance inaccuracies cause a deformed mounting position, since adequate freedom of motion in all three spatial directions is ensured by the elastic elements on which the clip, and thus the pipes are supported.

According to a preferred embodiment, the elastic elements can comprise springs, rubber elements, elastomer elements or the like. Such elements are generally known and can thus be readily produced or procured in any design and with any characteristics at little cost.

According to a further preferred embodiment of the invention, the fixed support bracket is T-shaped along a side-view, with a horizontal cross member and a vertical shaft. An elastic element each is arranged at either end of the cross member. This results in a structurally simple support bracket that can be produced easily and at little cost, for instance by way of an injection molding process. Due to its symmetrical construction, this shape further enhances the load bearing performance of the entire holding device.

To ensure free mobility of the clip in all spatial directions, an advantageous further embodiment provides that the clip surrounds the vertical shaft of the support bracket with play. This prevents any interference with the freedom of motion of the clip on the shaft since the clip can freely move around the shaft in all directions.

A two-part design of the clip with a lower part and an upper part simplifies and facilitates mounting of the pipes to be supported and does not require any tools. Further, if the lower part is supported on the elastic elements, the forces introduced into the clip by the pipes can be absorbed or dampened directly at the mounting point. This prevents any undesirable deformation and positively influences acoustic decoupling.

To prevent the lower part and the upper part of the clip from being lost during transport or installation, and to keep the upper part and the lower part at a predefined distance from one another so that the pipe can be inserted into the clip without any further manipulation, the upper part and the lower part are advantageously interconnected via at least one weak link.

According to an advantageous embodiment, the upper part and the lower part are provided with corresponding snap-lock elements for a positive locking connection. This securely fastens the two parts in their final assembled state and thus ensures a secure and firm hold of the pipes. In addition, the pipes are secured against falling out, so that even if the elastic elements are damaged, the decoupled element is positively secured relative to the fixed element.

A particularly advantageous clip is obtained in a preferred embodiment in which the upper part is spaced at a distance from the lower part in delivery condition, but rests against it in the final assembled state. This makes it possible during installation to insert the pipe into the clip between the upper part and the lower part without any further manipulation or working steps. In the final assembled state, the upper and lower parts rest against each other and thus securely hold the pipe.

In a further advantageous preferred embodiment, the lower part comprises a substantially flat middle section surrounding the vertical shaft and two partially circular holders for the pipes are provided at opposite lateral edges of the middle section. The partially circular holders are supported on the elastic elements. This provides a secure seat for the pipes in the holding device and prevents any unintended deformation. Furthermore, the support of the partially circular holders on the elastic elements ensures that the forces can be absorbed exactly where they occur or act so that good acoustic decoupling is achieved.

In a further development of the above-described embodiment, the upper part also comprises a substantially flat middle section surrounding the vertical shaft and two partially circular holders. In addition, the partially circular holders of the upper part and the partially circular holders of the lower part complement one another to form a circle so that the pipe is securely held in position. This embodiment further makes it possible to install the holding device of the present invention in any installation position (inverted, upright or lateral), since the pipes cannot fall out of the circular seats due to the form-fit clamping within the clip.

The holding device according to the invention can be fastened to the base with any fastening mechanism, which provides great flexibility with respect to its application.

Other objects, advantages and novel features of the present invention will become apparent from the following detailed description of the invention when considered in conjunction with the accompanying drawings.

DETAILED DESCRIPTION OF THE DRAWINGS

Figure 1:
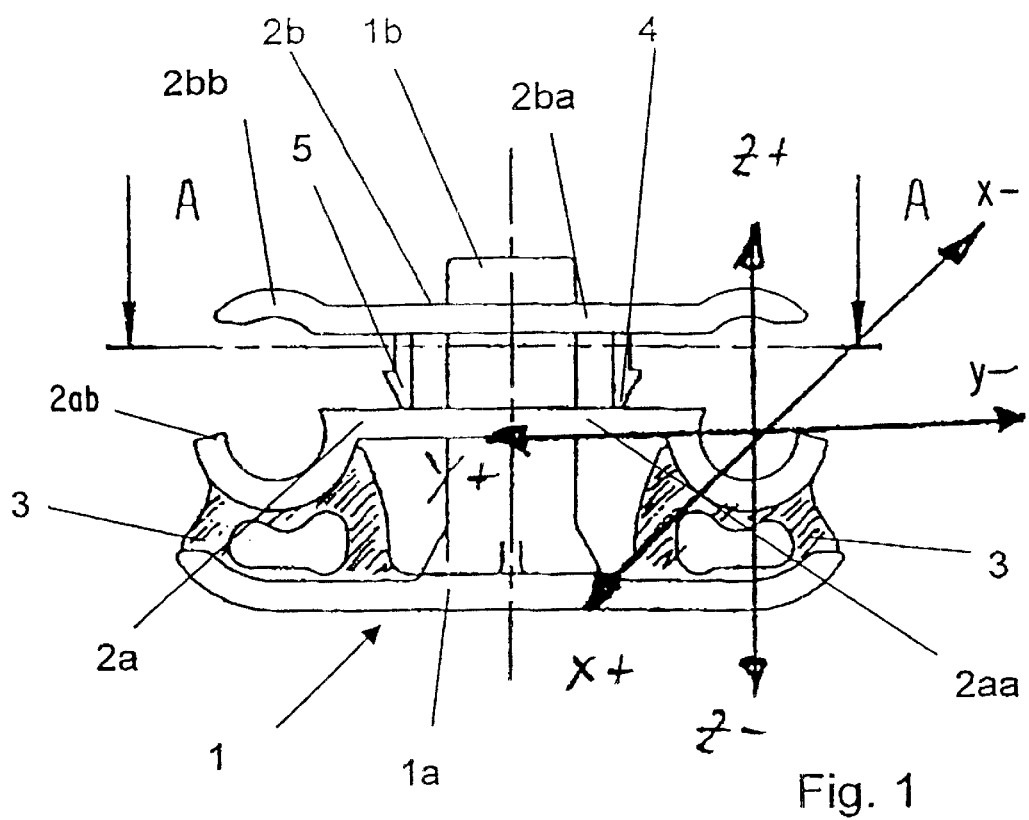
FIG. 1 is a holding device according to the invention in a delivery or a installation condition.

FIG. 1 shows a holding device according to the invention in a delivery condition ready to receive the pipe.

The holding device according to the invention includes a fixed support bracket 1 which can be used to hold pipes (not shown) of hydraulic systems. The support bracket 1 can be mounted to a base (not shown) by way of any type of fastening mechanism (also not shown).

The support bracket 1 is T-shaped in side view and includes a horizontal (relative to the representation in FIG. 1) cross member 1a extending on either side of a vertical shaft 1b. Shaft 1b can be hollow and can serve, for instance, to receive a fastening bolt.

The holding device further comprises a clip 2 carried by the support bracket 1. This clip serves to hold and support the pipe. To enhance the acoustic decoupling, the pipe can also be held via elastic elements (rubber tubing, etc.), so as to realize acoustic double decoupling. To ensure sufficient tolerance compensation as well as good acoustic decoupling of the pipe, clip 2 is supported on support bracket 1 via elastic elements 3. These elastic elements 3 may be springs, rubber elements, elastomer elements or the like.

Clip 2 includes a lower part 2a and an upper part 2b. The lower part 2a includes substantially flat rectangular middle section 2aa, which is provided with a central opening that surrounds the shaft 1b of the support bracket 1 with play. Partially circular seats 2ab for receiving the pipe are provided on two opposite edges of the middle section 2aa.

The upper part 2b is designed similarly to the lower part 2a. It includes a substantially flat rectangular middle section 2ba, which like the middle section 2aa, is provided with a central opening that surrounds the shaft 1b of the support bracket 1 with play, and two partially circular seats 2bb which are provided on opposite edges of the middle section 2ba. The seats 2ab of the lower part 2a and the seats 2bb of the upper part 2b complement one another to form a circle so that the pipe is securely held in position on clip 2. This makes it possible to install the holding device 1 in vertical, horizontal or lateral positions without the pipe being capable of falling out of the seats 2ab and 2bb.

Figure 3:
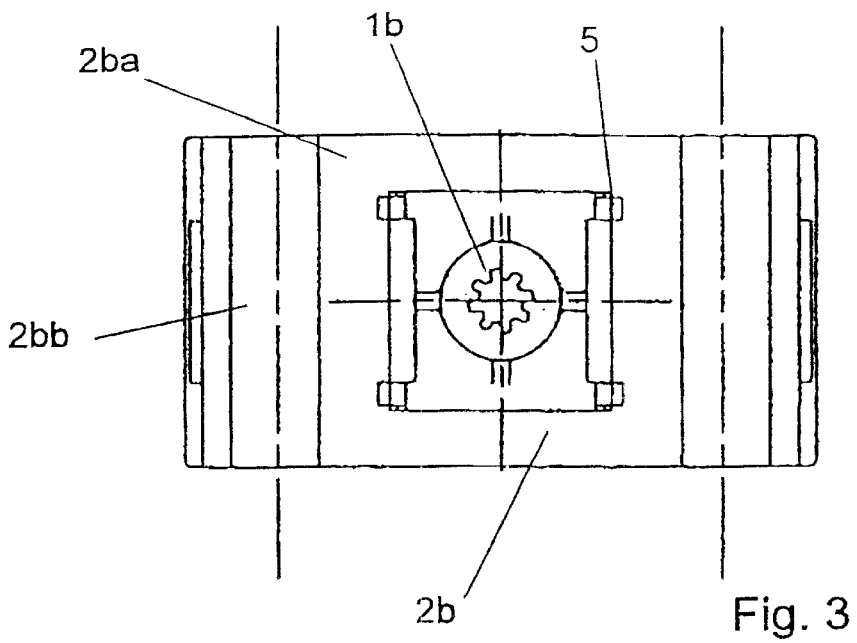
FIG. 3 is a section along line A—A in FIG. 1.
Figure 4:
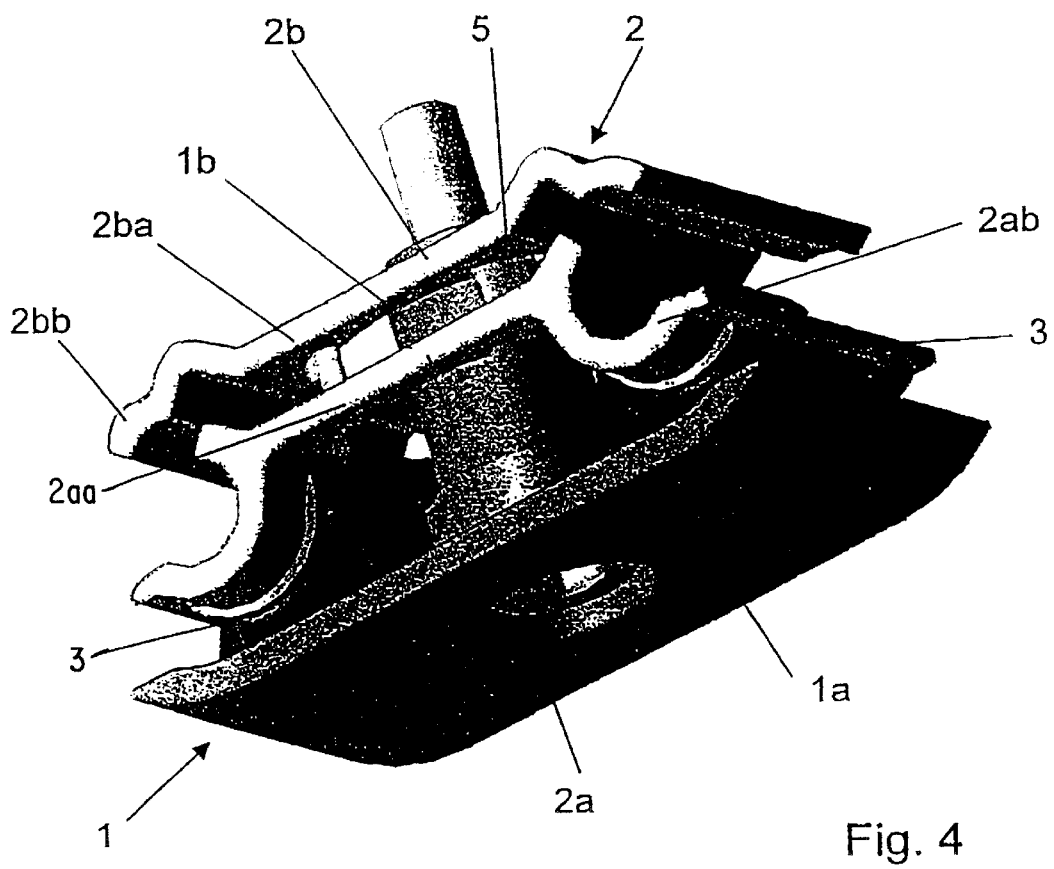
FIG. 4 is a perspective view of the holding device according to the invention.

The lower part 2a and the upper part 2b are interconnected via weak links 4 so that the lower part 2a and the upper part 2b are spaced at a distance from one another in the delivery condition. Furthermore, snap lock elements 5 are provided, by way of which the lower part 2a and the upper part 2b of the clip 2 are held together in the final assembled state. The snap lock elements 5 can be hook-shaped snap-in projections, which are provided, for instance, on the upper part 2b of clip 2 and which project in the direction of the lower part 2a. In this embodiment, the weak links 4 can be provided at the tips of the detents as shown in FIG. 1. This embodiment advantageously combines the snap lock elements 5 and the weak links 4 within a very small space. The snap lock elements 5 serve not only to snap together the lower part 2a and the upper part 2b but they are also arranged in such a way that they simultaneously create a keyed connection that permits the two parts to be joined together in only a single position in relation to one another as illustrated in the side view of FIG. 3.

The partially circular seats 2ab of the lower part 2a are arranged in such a way that they are supported via elastic elements 3 against the cross member 1a of the support bracket 1 in the area of the free ends thereof. Any force exerted by the pipes can thus be directly transmitted to the support bracket 1 via the elastic elements 3.

Figure 2:
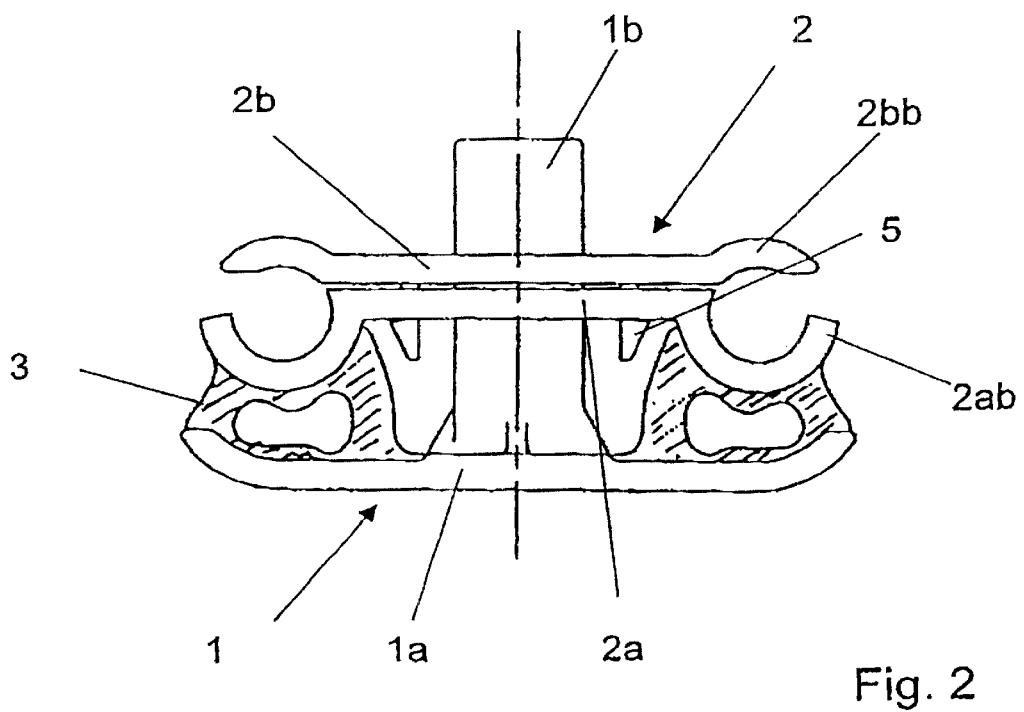
FIG. 2 shows the holding device according to the invention of FIG. 1 in its final assembled state.

The holding device according to the invention is delivered in the condition shown in FIG. 1 in which it is ready to receive the pipes. The pipes are placed into the partially circular seats 2ab of the lower part 2a. The upper part 2b of clip 2 is then shifted in the direction of the lower part 2a. This breaks the weak links 4, which connect the upper part 2b and the lower part 2a of the clip 2 in delivery condition and which may be provided on the snap lock elements 5. At the end of the displacement path, the snap lock elements 5 fixed to the two parts of clip 2 engage and thus hold the lower part 2a and the upper part 2b of clip 2 firmly together. In this condition, the pipes are securely held between the partially circular seats 2ab of the lower part 2a and the partially circular seats 2bb of the upper part 2b. This final assembled state is illustrated in FIG. 2.

Since the partially circular seats 2ab and 2bb are supported on the elastic elements 3, the pipes together with clip 2 are freely movable in all three spatial directions x, y and z. This compensates tolerances very well while ensuring good acoustic decoupling. Even if the mounting position of the holding device is twisted, the insulation properties remain unaffected due to the design of the invention. This is further enhanced by the fact that the middle sections 2aa and 2ba of the clip 2 surround the shaft 1b with play, so that the shaft 1b does not interfere with the freedom of motion of clip 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for pipes comprising:
   a fixed support bracket,
   a clip that is movable in all spatial directions carried by the support bracket, said clip having a lower part and an upper part, and
   elastic elements, supported between part of the fixed support bracket and said lower part of the clip, by which the clip is decoupled from the fixed support bracket.

2. The holding device as claimed in claim 1, wherein the elastic elements comprise springs, rubber elements or elastomer elements.

3. The holding device as claimed in claim 1, wherein the fixed support bracket is T-shaped in side view with a horizontal cross member and a vertical shaft and wherein the elastic elements include an elastic element arranged at each end of the cross member.

4. The holding device as claimed in claim 3, wherein the clip surrounds the vertical shaft of the support bracket with play.

5. The holding device as claimed in claim 1, wherein the upper part and the lower part are interconnected via at least one weak link.

6. The holding device as claimed claim 1, wherein the upper part and the lower part have mutually corresponding snap lock elements for a keyed connection with one another.

7. The holding device as claimed in claim 1, wherein the upper part is spaced at a distance from the lower part in a delivery condition and contacts the lower part in a final assembled state.

8. The holding device as claimed claim 1, wherein the support bracket is T-shaped, wherein the lower part comprises a substantially flat middle section surrounding a vertical shaft of the T-shaped fixed support bracket and two partially circular seats for supporting the pipes on opposite lateral edges of the middle section, and wherein the partially circular seats are supported on the elastic elements.

9. The holding device as claimed in claim 8, wherein the upper part comprises a substantially flat middle section surrounding the vertical shaft and two partially circular seats, wherein the partially circular seats of the upper part and the partially circular seats of the lower part complement one another and form a circle.

* * * * *